A. J. DUBEE.
COMBINED BED, COT, AND STRETCHER FOR MOTOR VEHICLES.
APPLICATION FILED JULY 19, 1920.
1,402,846.
Patented Jan. 10, 1922.
2 SHEETS—SHEET 1.
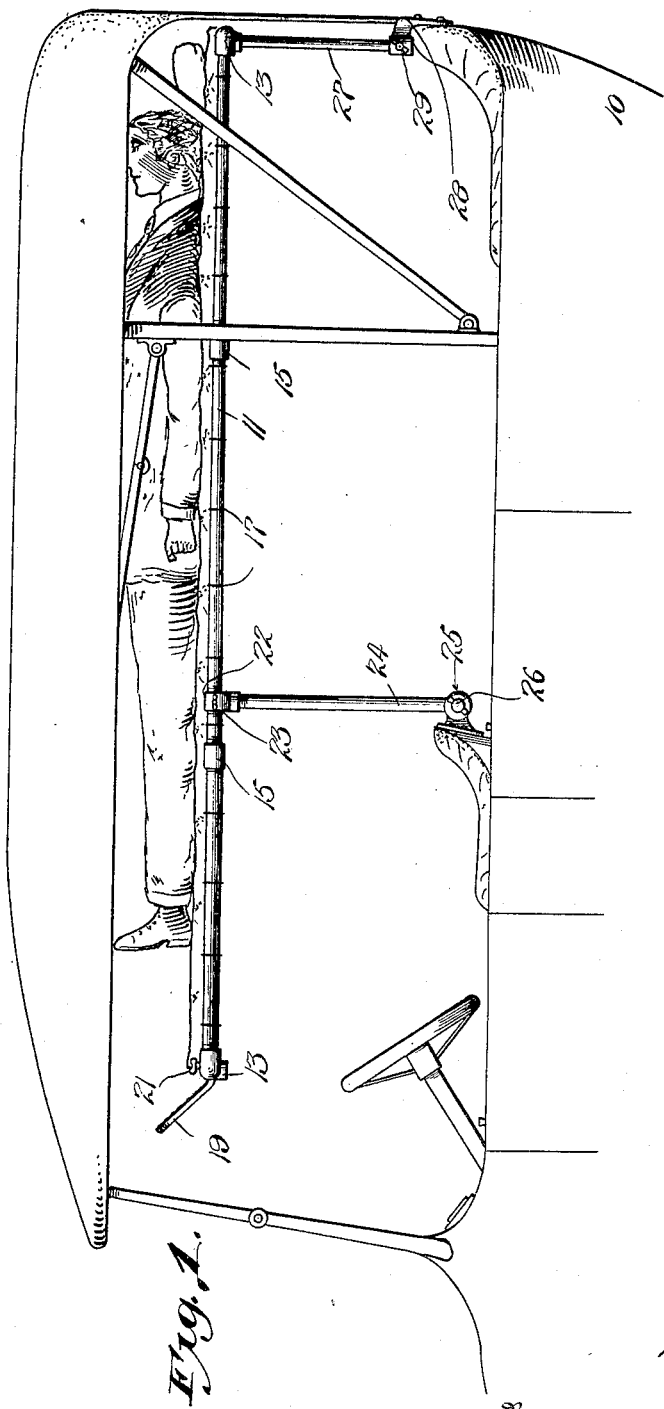
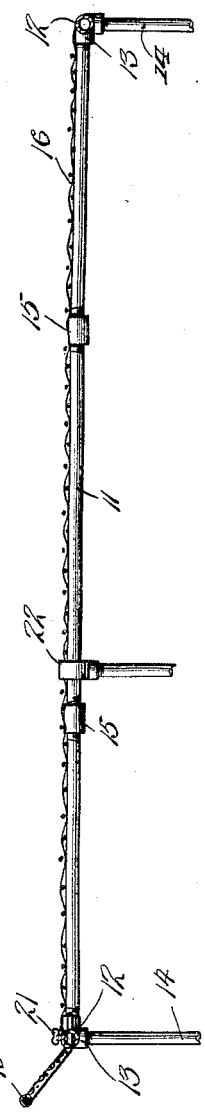
Inventor
A. J. Dubee.
By Lacey & Lacey, Attorneys

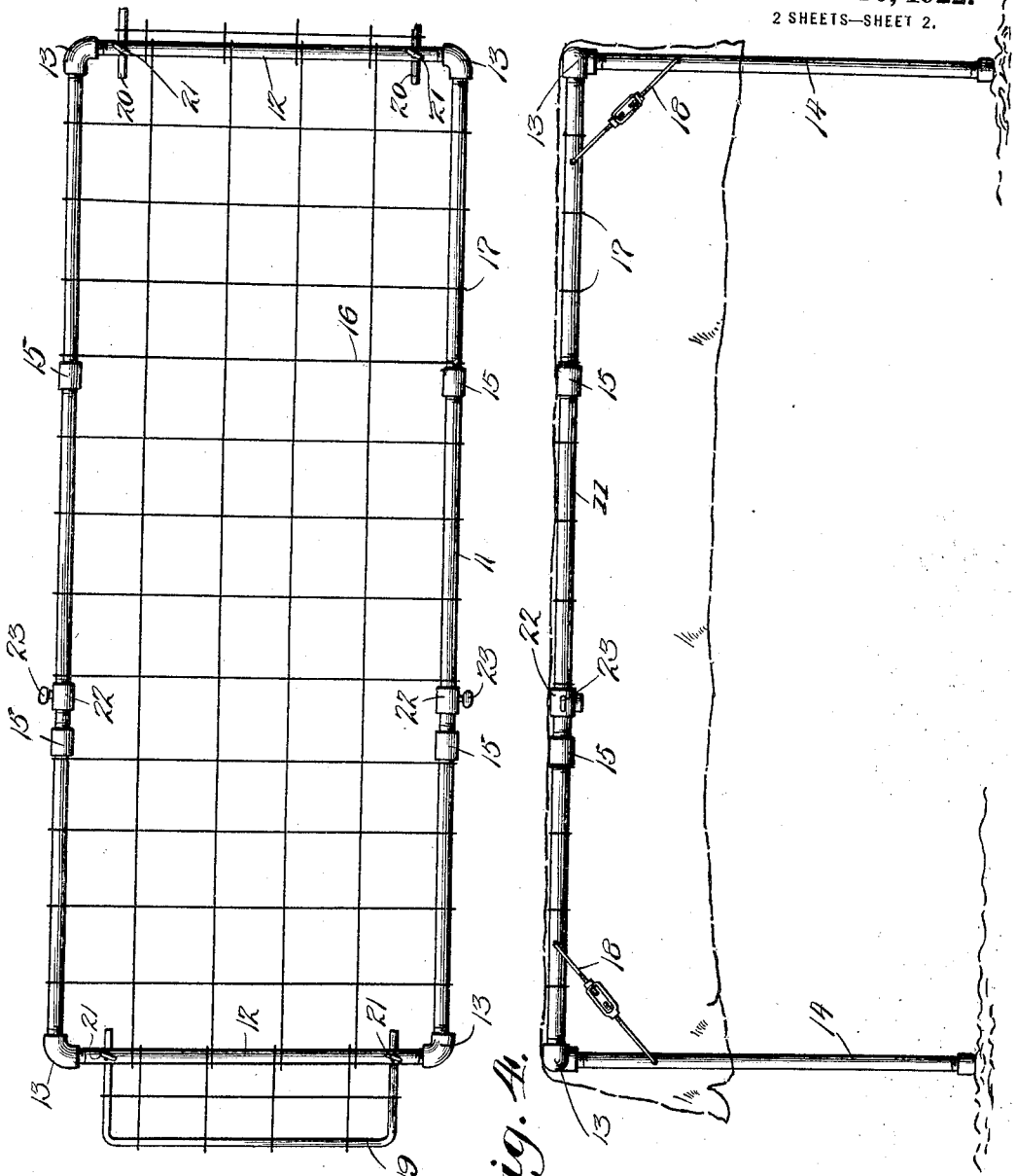

UNITED STATES PATENT OFFICE.

ADELARD J. DUBEE, OF GLENS FALLS, NEW YORK.

COMBINED BED, COT, AND STRETCHER FOR MOTOR VEHICLES.

1,402,846.   Specification of Letters Patent.   Patented Jan. 10, 1922.

Application filed July 19, 1920. Serial No. 397,192.

*To all whom it may concern:*

Be it known that I, ADELARD J. DUBEE, citizen of the United States, residing at Glens Falls, in the county of Warren and State of New York, have invented certain new and useful Improvements in Combined Beds, Cots, and Stretchers for Motor Vehicles, of which the following is a specification.

This invention relates to a combined cot, bed and stretcher and has as one of its principal objects to provide a device of this character which may be employed in connection with motor vehicles.

The invention has as a further object to provide a device which may be mounted within a motor vehicle to form a bed so that, when desired, the owner of the vehicle may comfortably sleep therein while, in case of emergency, an invalid may be carried upon the bed.

The invention has as a further object to provide a device which may be readily removed from the vehicle and used as a stretcher.

And the invention has as a still further object to provide a device which may be disassembled or collapsed so that the device may be conveniently carried beneath one of the seats of the vehicle.

Other and incidental objects will appear hereinafter.

In the drawings:

Figure 1 is a fragmentary side elevation showing my improved device mounted within a motor vehicle of conventional design, Figure 2 is a horizontal sectional view taken medially through the device, Figure 3 is a view showing the device in top plan, and Figure 4 is a side elevation of the device.

In order that the construction of my improved device and its manner of use may be readily understood I have, in the drawings, shown the invention in connection with a conventional type of motor vehicle 10. In carrying the invention into effect I employ an oblong frame having side bars 11 and end bars 12. These bars are preferably of tubular construction and are detachably connected by suitable elbows 13 into which are removably threaded legs 14. The side bars are, as particularly shown in Figure 3, of sectional construction and the sections of said bars respectively are detachably connected by suitable coupling sleeves 15 into which the confronting ends of the sections are threaded. Supported by the frame is a web 16. This web may be formed of wire or any other approved material and the crossed strands of the web are provided at their ends with hooks 17 detachably engaging over the side and end bars of the frame. Thus, as will be seen, a cot is formed, the legs 14 being designed to support the cot in the usual manner. However, when the device is thus employed as a cot, braces 18 for the legs are preferably used, these braces being arranged to extend between the side bars of the frame and the upper end portions of the legs. The braces are, of course, removable and preferably the side bars and legs are provided with suitable openings for receiving the ends of the braces. At the foot of the cot is arranged a foot rest 19 while at the head of the cot is arranged a head rest 20. The ends of the head and foot rests are inserted through suitable openings in the end bars 12 and threaded through said bars are thumb screws 21 detachably securing the rests in position. An entirely efficient cot is thus provided. However, should it be so desired, the head and foot rests of the cot may, as shown in Figure 4, be removed, when the device may be used as a table.

As previously intimated, the present device is particularly designed for use in connection with motor vehicles, so that the owner of such a vehicle may, if desired, sleep therein while, in case of emergency, an invalid may be comfortably carried within the vehicle. Slidable upon the side bars of the frame of the device are sleeves 22 which may be secured in adjusted position along said bars by thumb screws 23. Removably threaded into these sleeves to depend therefrom are posts 24 which are employed in lieu of the pair of legs 14 at the foot of the frame, and receiving the lower ends of said posts are brackets 25 secured to the rear side of the front seat of the vehicle. Preferably, the brackets are equipped with thumb screws 26 to engage the posts so that the posts will be prevented from accidental displacement. Supplanting the pair of legs 14 at the head of the frame of the device is a pair of posts 27 which are somewhat shorter than the posts 24. These posts 27 are threaded into the elbows 13 at the head of the frame and, at their lower ends are received in brackets 28 secured to the rear seat of the vehicle, these brackets being, like the brackets 25, equipped with thumb screws 29 for firmly securing the posts. Thus, the posts 24 and 27 will support the frame extending horizontally within the vehicle forming a bed and, as suggested in Figure 1, a person may, without inconvenience to the passengers in the vehicle, occupy the bed. Thus, in case of emergency, an invalid may be readily carried within the vehicle. Furthermore, by simply releasing the screws 26 and 29, the device may, without disturbing the invalid, be removed from the vehicle and by then detaching the posts 24 and 27, the device may be used as a stretcher. For the purposes of the owner of the vehicle the device will, of course, prove highly convenient since, as will be seen, the owner may, when desired, comfortably sleep within the vehicle. As will be observed, the head rest of the device is removed since the head rest would interfere with the back curtain of the vehicle.

Attention is now directed to the fact that the entire device may be readily collapsed. By simply loosening the thumb screws 21 the head and foot rests may be displaced. Also the legs 14 of the device and the posts 24 and 27, may be displaced when the web 16 may be detached from the frame. The frame itself may then be taken apart so that the complete device may be formed into a compact bundle which may be carried beneath one of the seats of the vehicle. I accordingly provide a particularly effective construction for the purpose set forth and a device which may be readily employed in connection with motor vehicles of substantially any conventional design.

Having thus described the invention, what is claimed as new is:

1. In a cot, the combination with spaced pairs of fixed brackets, of a frame, legs extending from the frame engaged with one pair of brackets, and other legs adjustable along the frame and engaged with the other pair of brackets.

2. In a cot, the combination with spaced pairs of fixed brackets, of a frame, legs extending from the frame engaged with one pair of brackets, sleeves slidably adjustable along the frame, means carried by the sleeves locking the sleeves in adjusted position, and legs extending from said sleeve engaged with the other pair of brackets.

In testimony whereof I affix my signature.

ADELARD J. DUBEE. [L. S.]